United States Patent [19]

Yasunaga et al.

[11] Patent Number: 4,876,113
[45] Date of Patent: Oct. 24, 1989

[54] METHOD FOR PRODUCING MAGNETIC RECORDING MEDIA

[75] Inventors: Tadashi Yasunaga; Koji Sasazawa, both of Kanagawa, Japan

[73] Assignee: Fuji Photo Film Co., Ltd., Kanagawa, Japan

[21] Appl. No.: 192,981

[22] Filed: May 12, 1988

[30] Foreign Application Priority Data

May 15, 1987 [JP] Japan .................................. 62-118521

[51] Int. Cl.$^4$ ............................................. B05D 3/06
[52] U.S. Cl. ..................................... 427/39; 427/130; 427/131; 427/132; 427/177; 428/695; 428/698; 428/900
[58] Field of Search ................. 427/39, 128, 130, 131, 427/132, 177; 428/695, 698, 900

[56] References Cited
U.S. PATENT DOCUMENTS 4,652,460 4/1987 Shirahata et al. ..................... 427/39

Primary Examiner—Bernard Pianalto
Attorney, Agent, or Firm—Sughrue, Mion, Zinn, Macpeak & Seas

[57] ABSTRACT

A method for producing a magnetic recording medium having improved corrosion resistance and durability. A magnetic metal thin film is formed on a nonmagnetic substrate. The substrate then is exposed to a glow discharge atmosphere, and immediately thereafter a protective lubricant layer is deposited over the magnetic metal thin film.

17 Claims, 1 Drawing Sheet

METHOD FOR PRODUCING MAGNETIC RECORDING MEDIA

BACKGROUND OF THE INVENTION

The present invention relates to a method for producing a magnetic recording medium having a magnetic layer formed of a metal thin film and used for a magnetic tape, magnetic disk, magnetic card, or the like. Particularly, the invention relates to a method for producing a magnetic recording medium excellent both in corrosion resistance and in durability.

For magnetic recording, heretofore so-called coating-type magnetic recording media have been used which are formed by applying magnetic powder onto a substrate with the magnetic powder particles being enveloped in an organic binder. On the other hand, in response to a recent demand for high-density recording media having improved performance characteristics, magnetic layers used in magnetic media have had to be made thinner while having a high coercive force and high saturation flux density. Magnetic recording media of the metal thin-film type having magnetic layers formed of metal thin films have been developed. Generally, the metal thin film does not contain appreciable amounts of non-magnetic components (compared with the aforementioned coating type magnetic film), and consequently the metal thin film has a high saturation flux density.

Methods for producing such magnetic metal thin films are classified into two types, one being a method carried out by means of a wet treatment, such as electrolytic plating, electroless plating, or the like, and the other being carried out by means of a dry treatment, such as vacuum evaporation, ion plating, sputtering, or the like. Particularly, the method of the latter type employing a dry treatment has been of interest from the viewpoints of manufacturing efficiency, reproducibility and stability, and various research on such methods has been carried out. For example, such research has included investigations of oblique-evaporated films (so-called evaporated tapes) of cobalt alloy formed by vacuum evaporation, perpendicular magnetic films of cobalt-chrome alloy formed by sputtering, and the like.

Although the recording media of the metal thin film type are ideal with respect to magnetic characteristics and electromagnetic conversion characteristics as described above, such recording media are inferior in corrosion resistance because of the innate properties of metal thin films. The corrosion resistance problem has dominated the research on magnetic recording media of the metal thin film type.

Various proposals have been made as to countermeasures. Examples of these proposals include oxidizing, nitrifying or carbonating the surface of the magnetic metal thin film and the like (as disclosed in Japanese Patent Unexamined Publication No. 50-33806), applying a protective film of $SiO_2$, SiC or the like onto the metal thin film (as disclosed in Japanese Patent Unexamined Publication No. 50-104602), and adding additive elements excellent in corrosion resistance to the magnetic metal components (as disclosed in Japanese Patent Unexamined Publication No. 59-61013). However, all of these techniques have a disadvantage in that the magnetization properties of the resulting recording media are deteriorated. Therefore, a way of maintaining corrosion resistance without loss of the original advantages of metal thin film media has been sought.

The term "corrosion resistance" actually includes several separable concepts. That is, corrosion involves several different aspects, which include occurrence of rust due to so-called dew condensation or spontaneous dew generation (or cyclic dew generation), damage due to fine-grained salt particle (mainly in seaside regions), and damage due to corrosive gases such as $H_2S$ gas, $SO_2$ gas, $NO_x$ gas, or the like.

Heretofore, the estimation of the corrosion resistance of metal thin film type magnetic recording media has been carried out mainly based on the occurrence of rust as a result of dew condensation and on the decrease of saturation flux after maintaining the medium in an atmosphere of high temperature and high humidity (for example, 60° C. and 90% RH). Also, the present applicants have carried out a corrosion test with respect to a corrosive gas upon various types of magnetic recording media, and consequently have found that metal thin film type magnetic recording media, especially metal thin film media containing cobalt as a main component, are inferior in corrosion resistance against $SO_2$ gas. $SO_2$ gas pollution is unfortunately present in many large cities, industrial areas, and other areas. Accordingly, magnetic recording media must have corrosion resistance against $SO_2$ to make those media fit for practical use.

SUMMARY OF THE INVENTION

It is therefore an object of the present invention to provide a magnetic recording medium having sufficient corrosion resistance against SOgas, and also a reduced coefficient of friction.

The present inventors have thoroughly examined the aforementioned problems from the viewpoints of methods and processes for manufacturing magnetic recording media and as a result have solved these problems by simple means.

In short, the present invention provides a method for producing a magnetic recording medium in which a magnetic metal thin film is formed on a nonmagnetic substrate, and a protective lubricant layer is further formed on the thin film. In the inventive method, immediately after the surface of the thin film is exposed to a glow discharge atmosphere, the protective lubricant layer is formed.

Provision of a back coating layer on the side opposite the magnetic film, provision of an intermediate layer between the substrate and the magnetic film for the purpose of improving interfacial properties, crystalline properties of the magnetic film and the like, provision of magnetic metal thin films on the front and rear sides of the substrate, and other suitable steps may be employed with the method the present invention. Further, a protective film formed of a material selected from the group for metals, oxides, nitrites, carbides or the like can be provided on a magnetic metal thin film. Immediately after the surface of the protective film is exposed to a flow discharge, a protective lubricant layer is formed on the protective film.

Use of glow discharge in the production of metal thin film type magnetic recording media involves forming a glow discharge simultaneously with the production of the magnetic thin film. This is an ion plating method in a general simple form. As another technique, exposure to glow discharge in an atmosphere of an oxidizing gas just after the formation of the magnetic film (Japanese Patent Application No. 59-216927) may be employed.

DESCRIPTION OF THE PREFERRED EMBODIMENTS

Figure 1:
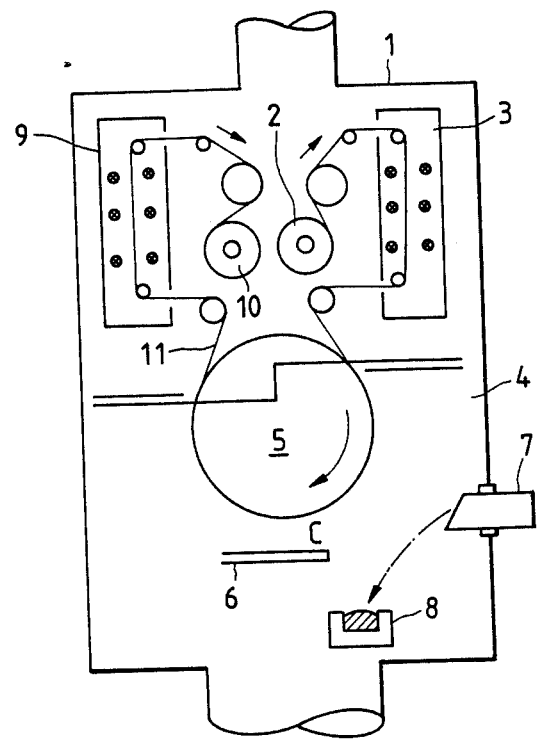
FIG. 1 shows schematically a conventional take-up type evaporation apparatus.

Generally, a conventional take-up type evaporating apparatus has glow discharge zones as shown, for example, in FIG. 1, immediately before and after a film forming zone. Namely, in FIG. 1, glow discharge zones 3 and 9 are respectively located just before and just after the area where the magnetic film is formed by vacuum evaporation in a lower chamber 4. The discharge zone 3 just before the film-forming zone is mainly used to subject a substrate 11 to an ion bombardment treatment to thereby cleanse the substrate physically. The discharge zone 9 just after the film-forming zone is mainly employed to remove electric charge from the magnetic recording medium after the formation of the magnetic film to thus prevent the medium from wrinkling. These treatments differ significantly in purpose from that of the present invention.

The present invention specifically provides a process for treating an evaporation-deposited web wound on a take-up reel 10 in an apparatus such as shown in FIG. 1. In the inventive process, the wound evaporation-deposited web is exposed to glow discharge while it is unrolled, and immediately after exposure, a protective lubricant layer is formed. The glow discharge treatment may be effected by use of a separate apparatus or may be carried out simply by use of the same apparatus as shown in FIG. 1. In the latter case, the conveyance system shown in the drawings may be driven reversely without effecting vacuum evaporation in the lower chamber 4 so that the glow discharge treatment is carried out by use of the discharge zones 9 and 3. Otherwise, the wound evaporation-deposited web may be set in the apparatus of FIG. 1 then subjected to glow discharge while the discharge zones 3 and 9 (or only on discharge zone) are actuated. A rare gas, such as Ne, Ar, Kr, or the like, or a standard gas, such as $O_2$, $N_2$, $CO_2$, or the like, is introduced into the discharge zones, and then glow discharge is started. The gas can be selected in accordance with the purpose of use. If the surface of the film must be physically improved in quality, a rare gas is selected. If it must be chemically improved in quality, a reactive gas is selected. It is, however, necessary to determine suitable conditions because discharge characteristics widely vary according to the type of gas introduced and the pressure thereof.

Figure 2:
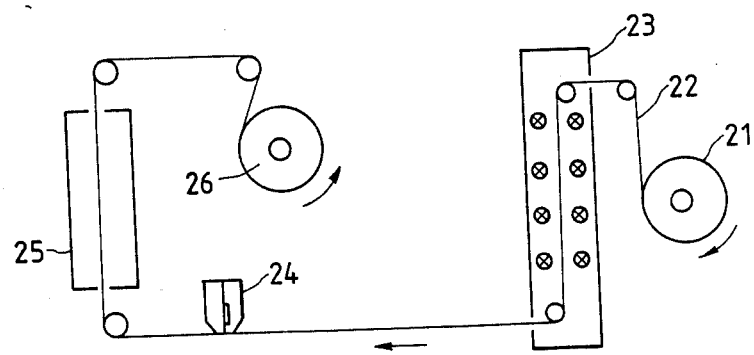
FIG. 2 is a view showing a coating apparatus including a glow discharge zone.

Immediately after the glow discharge treatment has been carried out, the protective lubricant layer is applied to the surface of the magnetic thin film. What suffices as "immediately" varies with the circumstances at hand. In general, however, the effect of the glow discharge treatment will be lost if the time from the glow discharge treatment to the process of formation of the protective lubricant layer is too long because the surface of the magnetic thin film will be contaminated with air-borne impurities. In the case of a wound evaporation-deposited web, the surface of the metal thin film is maintained in a clean state for a relatively long time because the film is rolled up. In that case, the interval between the two processes may be ten hours or less, preferably, one hour or less. On the other hand, sheet-like magnetic films prepared by a batch apparatus or an in-line apparatus are relatively rapidly contaminated with impurities. Accordingly, in the case of sheet-like magnetic films, the time interval between the two processes should be less than one hour, preferably, less than ten minutes. If both the glow discharge treatment zone and the lubricant coating zone are provided within one apparatus (FIG. 2) and the coated magnetic films are passed to the glow discharge region directly after formation of the magnetic metal thin film, the time interval becomes unimportant. In FIG. 2, the magnetic film is subject to a glow discharge treatment in a glow discharge zone 23, coated with a protective lubricant layer by a coating head 24, and then dried in a drying zone 25.

Examples of chemical compounds used for the protective lubricant layer include: fatty acid having 12 to 18 carbon atoms, such as oleic acid, myristic acid, stearic acid and the like; metal salts of such acids; esters of such acids; compounds prepared by replacing the hydrogen atoms of these acids with fluorine atoms; and the like. The preferred compounds contain at least 50% fatty acids or metal salts thereof. The coverage amount of these compound is within a range of from 3 to 30 $mg/m^2$, preferably, within a range of form 5 to 15 $mg/m^2$. If no compound having a functional group having a strong affinity for the surface of the metal thin film is used, the effect of the invention will become unsatisfactory.

The selected compound is dissolved in an organic solvent, such as methanol, ethanol, methylethyl ketone, methylisobutyl ketone and the like, and then applied to the magnetic film by an ordinary method.

Examples of metal alloys used to form the metal magnetic thin film layer include metal alloys mainly containing Co, such as Co, Co—Ni, Co—Cr, Co—Fe, Co—Pt, Co—Re, and the like. Otherwise, the effects of the invention with respect to running durability can be obtained with thin films of metals such as Fe, TbFe, FeCo, TbFeCo, Fe—N, and $FeO_x$, as will be described later with reference to specific examples, although these metals are not as strong in corrosion resistance against $SO_2$ as alloys mainly containing Co.

The present invention will be described in more detail with reference to illustrative examples, but the invention is not limited to those examples.

EXAMPLE 1

CoNi-O evaporated tape was prepared by use of a vacuum evaporating apparatus as shown in FIG. 1. Using $Co_{80}Ni_{20}$ as a starting material and with the introduction of oxygen, a 2000 Å thick CoNiO magnetic layer was deposited on a 9 $\mu$m thick polyethylene terephthalate film of width 100 mm, and then the resulting web was wound up on a take-up roller 10. After being left in air for three days, the wound evaporated web was placed again in the apparatus as a feed reel 2 as shown in FIG. 1, and then exposed in a glow discharge atmosphere with actuation of the glow discharge zone 9. The surface of the magnetic layer was subjected to bombardment in the glow discharge zone 9 for ten seconds while introducing Ar into the zone 9. A discharge voltage of AC 1000 V and a glow current of 0.15 $mA/cm^2$ were employed. The sample thus prepared was taken out of the vacuum tank, and after 30 minutes had lapsed, a methylethyl ketone solution of stearic acid was applied to the surface of the magnetic layer in a coverage amount of 12 $mg/m^2$. After such application, the resulting sample was cut into 8 mm lengths to prepare a slit sample.

COMPARATIVE EXAMPLE 1

A slit sample was prepared in the same manner as described above in Example 1, except that the glow discharge treatment was omitted.

EXAMPLE 2

In an ordinary batch-type sputtering apparatus, a CoCr medium of $Co_{80}Cr_{20}$ was prepared on a polyimide base by RF sputtering (film thickness: 3000 Å). The sheet medium was exposed in an Ar glow discharge atmosphere in the same apparatus. After the glow discharge, dry $N_2$ was introduced into the apparatus, and then a solution of copper oleate was manually applied to the surface of the magnetic layer.

COMPARATIVE EXAMPLE 2

A sheet sample was prepared in the same manner as described above in Example 2, except that the glow discharge treatment was omitted.

The samples prepared in the manners described above were tested for corrosion resistance. Using a gas corrosion test apparatus GLP-91C made by Yamazaki Seiki Laboratory, the corrosion resistance of the samples was estimated by the external appearance after the samples were left in an atmosphere of 1 ppm $SO_2$, 25° C. and 75% RH for 72 hours. With respect to the samples of Example 1 and comparative Example 1, the IEC coefficients of friction of the samples against a stainless guide post were measured in an atmosphere of 23° C. and 50% RH.

|  | Corrosion resistance against $SO_2$ | IEC coefficient of friction ($\mu$) | |
| --- | --- | --- | --- |
|  |  | 1 pass | 100 passes |
| Example 1 | O | 0.20 | 0.19 |
| Comparative Example 1 | x | 0.21 | 0.25 |
| Example 2 | O |  |  |
| Comparative Example 2 | Δ |  |  |

(O = good, Δ = fair, x = poor)

According to the present invention, the metal thin film type magnetic recording medium can be greatly improved in corrosion resistance against $SO_2$. Further, it is apparent that the medium is excellent in the stability of its coefficient of friction ($\mu$). It can be assumed that these effects are caused by close contact and tight bonding between the metal thin film magnetic layer and the lubricant protective layer.

What is claimed is:

1. A method for producing a magnetic recording medium comprising the steps of: forming a magnetic metal thin film on at least one side of a nonmagnetic substrate; exposing a surface of said thin film to a glow discharge atmosphere; and immediately forming a protective lubricant layer on said thin film.

2. A method of claim 1, further comprising the step of forming a protective film of a material selected from the group consisting of metals, oxides, nitrides, and carbides on said magnetic metal thin film prior to the step of exposing the thin film to said glow discharge atmosphere.

3. The method of claim 1, wherein said glow discharge atmosphere is formed with a gas selected from the group consisting of Ne, Ar, Kr, $O_2$, $N_2$ and $CO_2$.

4. The method of claim 1, wherein said substrate is in the form of a tape, and further comprising the steps of winding up said substrate after said step of exposing a surface of said thin film to a glow discharge atmosphere, and unwinding said magnetic metal thin film prior to said step of forming a protective lubricant layer on said thin film.

5. The method of claim 4, wherein a time between said step of exposing a surface of said thin film to a glow discharge atmosphere and said step of forming a protective lubricant layer on said thin film is less than 10 hours.

6. The method of claim 4, wherein a time between said step of exposing a surface of said thin film to a glow discharge atmosphere and step of forming a protective lubricant layer on said thin film is less than 1 hour.

7. The method of claim 1, wherein said substrate is in the form of a sheet-like material, and wherein a time between said step of exposing a surface of said thin film to a glow discharge atmosphere and said step of forming a protective lubricant layer on said thin film is less than 1 hour.

8. The method of claim 1, wherein said substrate is in the form of a sheet-like material, and wherein a time between said step of exposing a surface of said thin film to a glow discharge atmosphere and said step of forming a protective lubricant layer on said thin film is less than 10 minutes.

9. The method of claim 1, wherein said protective lubricant layer is formed of a fatty acid having 12 to 18 carbon atoms.

10. The method of claim 9, wherein said protective lubricant layer is formed from a material selected from the group consisting of oleic acid, myristic acid, stearic acid, metal salts of any of said acids, esters of any of said acids, and compounds prepared by replacing hydrogen atoms of any of said acids with fluorine atoms.

11. The method of claim 9, wherein an amount of coverage of said protective lubricant layer is in a range from 3 to 30 mg/m².

12. The method of claim 9, wherein an amount of coverage of said protective lubricant layer is in a range from 5 to 15 mg/m².

13. The method of claim 10, wherein said material of said protective lubricant layer contains at least 50% fatty acids or metal salts of fatty acids.

14. The method of claim 10, wherein said material of said protective lubricant layer is dissolved in an organic solvent.

15. The method of claim 14, wherein said organic solvent is selected from the group consisting of methanol, ethanol, methylethyl ketone, and methylisobutyl ketone.

16. The method of claim 1, wherein said magnetic metal thin film is formed of a material selected from the group consisting of Co, Co—Ni, Co—Cr, Co—Fe, Co—Pt, and Co—Re.

17. The method of claim 1, wherein said magnetic metal thin film is formed of a material selected from the group consisting of Fe, TbFe, FeCo, TbFeCo, Fe—N, and $FeO_x$.

* * * * *